United States Patent
Iwamura

(10) Patent No.: US 7,881,695 B2
(45) Date of Patent: Feb. 1, 2011

(54) FIXED NETWORK MASTER

(75) Inventor: Ryuichi Iwamura, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 968 days.

(21) Appl. No.: 11/343,763

(22) Filed: Jan. 31, 2006

(65) Prior Publication Data

US 2006/0233142 A1 Oct. 19, 2006

Related U.S. Application Data

(60) Provisional application No. 60/671,225, filed on Apr. 13, 2005.

(51) Int. Cl.
*H04W 4/00* (2009.01)
(52) U.S. Cl. .................... 455/402; 370/259
(58) Field of Classification Search .............. 455/420
See application file for complete search history.

(56) References Cited

U.S. PATENT DOCUMENTS

| | | | | |
|---|---|---|---|---|
| 2003/0016732 A1* | 1/2003 | Miklos et al. | ............... | 375/132 |
| 2004/0006484 A1* | 1/2004 | Manis et al. | ................ | 704/500 |
| 2004/0062229 A1* | 4/2004 | Ayyagari et al. | ............ | 370/351 |
| 2004/0111496 A1* | 6/2004 | Han et al. | ................... | 709/220 |
| 2004/0151390 A1 | 8/2004 | Iwamura | | |
| 2004/0177167 A1 | 9/2004 | Iwamura et al. | | |
| 2004/0184406 A1 | 9/2004 | Iwamura | | |
| 2004/0208139 A1 | 10/2004 | Iwamura | | |
| 2004/0214527 A1* | 10/2004 | Lim et al. | ................. | 455/41.2 |
| 2004/0261101 A1 | 12/2004 | Iwamura | | |
| 2005/0015805 A1 | 1/2005 | Iwamura | | |
| 2005/0018766 A1 | 1/2005 | Iwamura | | |
| 2005/0044211 A1* | 2/2005 | Adhikari | ..................... | 709/224 |
| 2005/0047379 A1 | 3/2005 | Boyden et al. | | |
| 2005/0063355 A1 | 3/2005 | Iwamura | | |
| 2005/0108760 A1 | 5/2005 | Iwamura | | |
| 2005/0169222 A1 | 8/2005 | Ayyagari et al. | | |
| 2005/0185629 A1 | 8/2005 | Kuroda et al. | | |
| 2005/0195968 A1 | 9/2005 | Park et al. | | |
| 2005/0210295 A1 | 9/2005 | Iwamura | | |
| 2006/0106963 A1* | 5/2006 | Sasaki et al. | ................ | 710/110 |
| 2008/0298275 A1* | 12/2008 | De Sousa | .................... | 370/255 |

* cited by examiner

*Primary Examiner*—Charles N Appiah
*Assistant Examiner*—Jaime M Holliday
(74) *Attorney, Agent, or Firm*—Miller Patent Services; Jerry A. Miller

(57) ABSTRACT

An exemplary method of operation of network devices with one device operating as a master device on a communication network involves the master device broadcasting a beacon during a communication session being carried out over the network; the master device determining that the communication session being carried out over the network has ended; the master device ceasing broadcast of the beacon; the master device entering a sleeping or power saving mode; at a client device on the network, transmitting a master search message requesting services of a master device while the master device is in the sleeping or power saving mode; the master device responding to the master search message; and the master device resuming broadcasting beacon signals. This abstract is not to be considered limiting, since other embodiments may deviate from or contain a subset of the features described in this abstract.

32 Claims, 3 Drawing Sheets

FIXED NETWORK MASTER

CROSS REFERENCE TO RELATED DOCUMENTS

This application is related to and claims priority benefit of U.S. Provisional Application No. 60/671,225 filed Apr. 13, 2005, which is hereby incorporated herein by reference.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION-BY-REFERENCE OF MATERIAL SUBMITTED ON A COMPACT DISC

Not Applicable.

BACKGROUND

As Home Networks are becoming more common, Audio/Video (A/V) products, Personal Computers (PCs), Personal Digital Assistants (PDAs) and other electronic appliances will be connected in order to communicate each other. Powerline Communication (PLC) Network such as those defined in the HomePlug™ specifications are expected to form a backbone of many home network systems.

In current PLC networks, there exists a master in the network which performs functions including the following functions:

(1) Beacon signal transmission;
(2) Device association and authentication;
(3) Admission control and bandwidth assignment; and
(4) Communication with other masters in neighbor networks.

Usually, the most intelligent device on the network is established to be the master for the particular network. The mechanism for determining which device serves as the master is documented in, for example, the various HomePlug™ specifications and is beyond the scope of this discussion. However, for example, the user may configure an appropriate device as a master in certain networks.

In networks designed to operate according to present standards, it is not usually easy or desirable to transfer the master's functions to another device. So, the master generally remains the same even when it is not in communication with any other device. In order for a device to begin communication over the network, the device must first find the network's master. This is generally accomplished by detection of the master's broadcast beacon. If the master is turned off or ceases to function, a new master must be established in order to carry out communication on the network.

BRIEF SUMMARY

Not Applicable.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
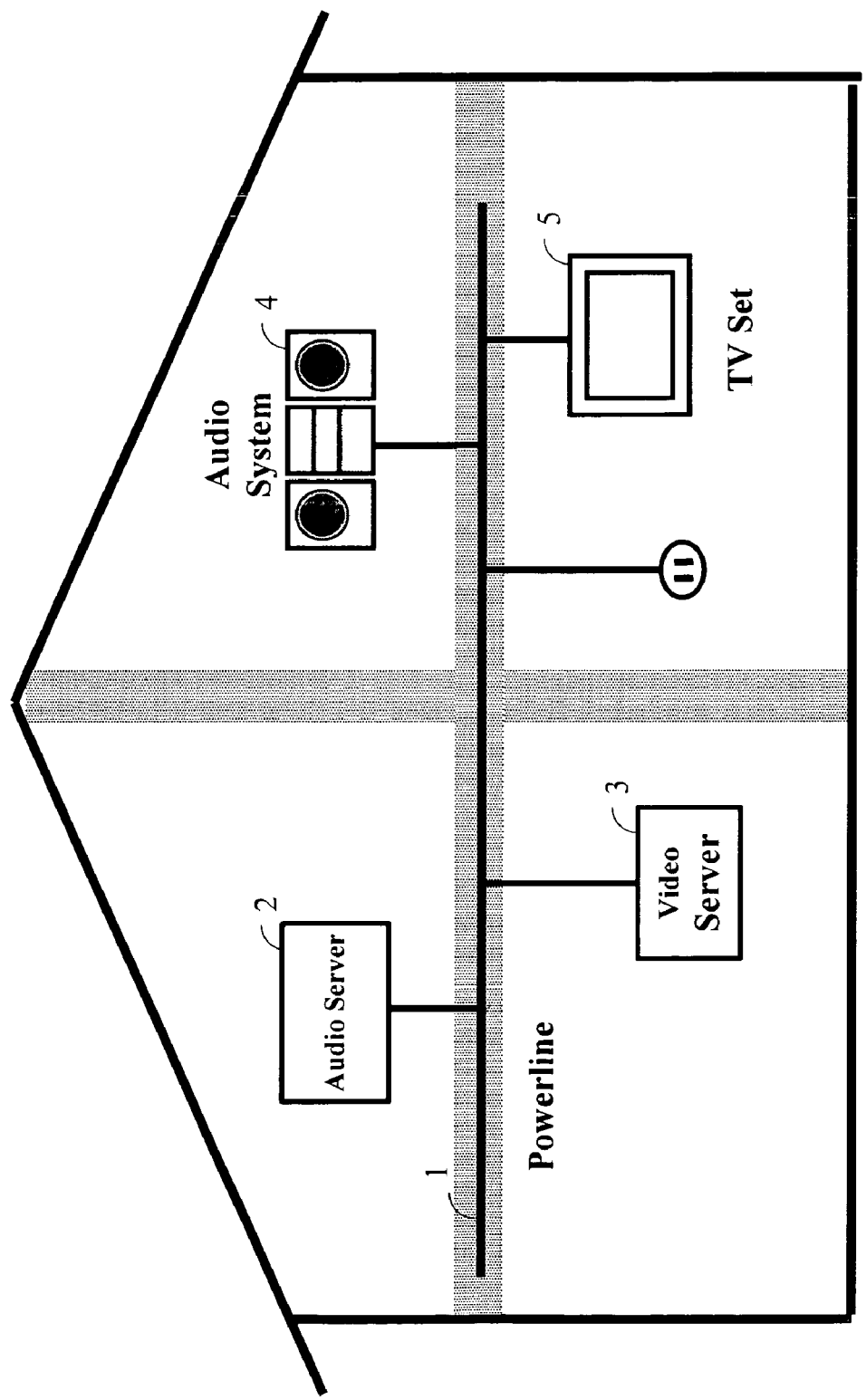
FIG. 1 is an illustration of a simple home PLC network consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In PLC networks, as well as other networks based upon a master device arrangement, the master is normally always transmitting a beacon. Hence, the master is unable to go into a low power mode of operation (since beacon transmission requires some power consumption). If a master were to enter such a low power (sleep or standby) state, it would create a problem in how a device that starts communication while the master is in such a low power state first finds the master (e.g., in order to obtain a bandwidth assignment). If the communication is initiated by the "ex-master" (i.e., the device that acted in the capacity of master most recently), there is no problem. However, when one of the other network devices (clients) initiates communication with another device, the client generally does not know who the master was. In this scenario, no communication can be carried out without initiation of beaconing by a master in order to establish synchronization of the communication, followed by the master assigning bandwidth for the communication.

One possibility is that in the absence of a master the client initiating communication becomes the new master. Since the master performs many functions, it is generally undesirable for the master to change frequently. In fact, in most home networks it is very desirable that a single device always serve as master. However, it is also desirable that the master be able to enter a lower power consumption mode of operation.

In accordance with current standards, this problem is avoided by requiring that the original master always sends beacons even if no device on the network is communicating. As a result, the master can never enter a sleeping or power saving standby mode, since it must continue to transmit a beacon in order to permit other network devices to communicate. In a PLC network, for example, such beacon is transmitted approximately every 33 mS. Since the master must always be active, it is difficult to obtain satisfactory energy savings. For example, it is difficult to achieve energy savings adequate to meet the Environmental Protection Agency's (EPA) Energy Star requirement for very low power consumption (1 watt or less) in standby (power saving or sleeping) mode while continuing to transmit beacons every 33 mS. The Energy Star requirements are published at the energystar.gov Internet web site at the time of this writing.

In accordance with certain embodiments consistent with the present invention, a mechanism is provided for a single device to remain a master without unnecessary or redundant beaconing. This opens the door to the possibility to place the master device in a low power consumption mode to conserve energy.

Referring now to FIG. 1, an example of a powerline home network is depicted using a PLC network in this example. Audio Server 2, Video Server 3, Audio System 4 and TV Set 5 are connected with the powerline network 1. For purposes of this example, assume that Video Server 3 is the master device of the network 1, and that Audio Server 2 is sending an audio stream to Audio System 4. Simultaneously, Video Server 3 is sending an audio/video stream to TV Set 5.

The Video Server 3 includes a programmed processor carrying out instructions that establish its operation as the master device in the network, in accordance with certain embodiments consistent with the present invention. The Video Server 3 further incorporates a power line communication interface in this exemplary embodiment, as do the other devices connected to the PLC network. Such PLC network interfaces are known and commercially available.

When the user finishes watching a particular video stream on the TV, Video Server 3 terminates streaming of the video to the TV. However, as the network master device, Video Server 3 continues to transmit beacons in support of the connection between Audio Server 2 and Audio System 4 so that the audio streaming can continue between Audio Server 2 and Audio System 4.

When Audio Server 2 terminates streaming to Audio System 4 and none of the network's devices are communicating, Video Server 3 stops beaconing in accordance with the present embodiment (whereas under established standards, the beaconing would continue). This leaves the network without a periodic beacon signal, but frees the master device to enter a lower power state to conserve energy.

Now suppose that Audio Server 2 is instructed by the user to start streaming content. In order to do so, Audio Server 2 needs to find the master in order to determine the appropriate parameters to use in the streaming process and to establish a connection to the Audio System 4. In accordance with certain embodiments consistent with the present invention, Audio Server 2 broadcasts a master search message over the network to all other devices, when it determines that no beacon signal is present. Any suitable predefined signal can be used as the master search message. Video Server 3, being the designated master, responds back to Audio Server 2 and starts beaconing. Assuming that Video Server 3 is turned on and correctly functioning, albeit in a lower power standby state, it receives the master search message and responds with a beacon signal. The communication between Audio Server 2 and Audio System 4 can thereby resume. But, if no response is returned (i.e., the Video Server 3 is malfunctioning or turned off or disconnected from the network), Audio Server 2, upon failure to receive a beacon signal, may assume the role of master and start beaconing and streaming (assuming Audio Server 2 is capable of serving as a network master).

In accordance with certain embodiments consistent with the present invention, there may be one or more attempts to find a master before the sender of the master search message concludes that no master is available. In other embodiments, when an established response time is reached without receipt of a beacon, a new master is established.

Figure 2:
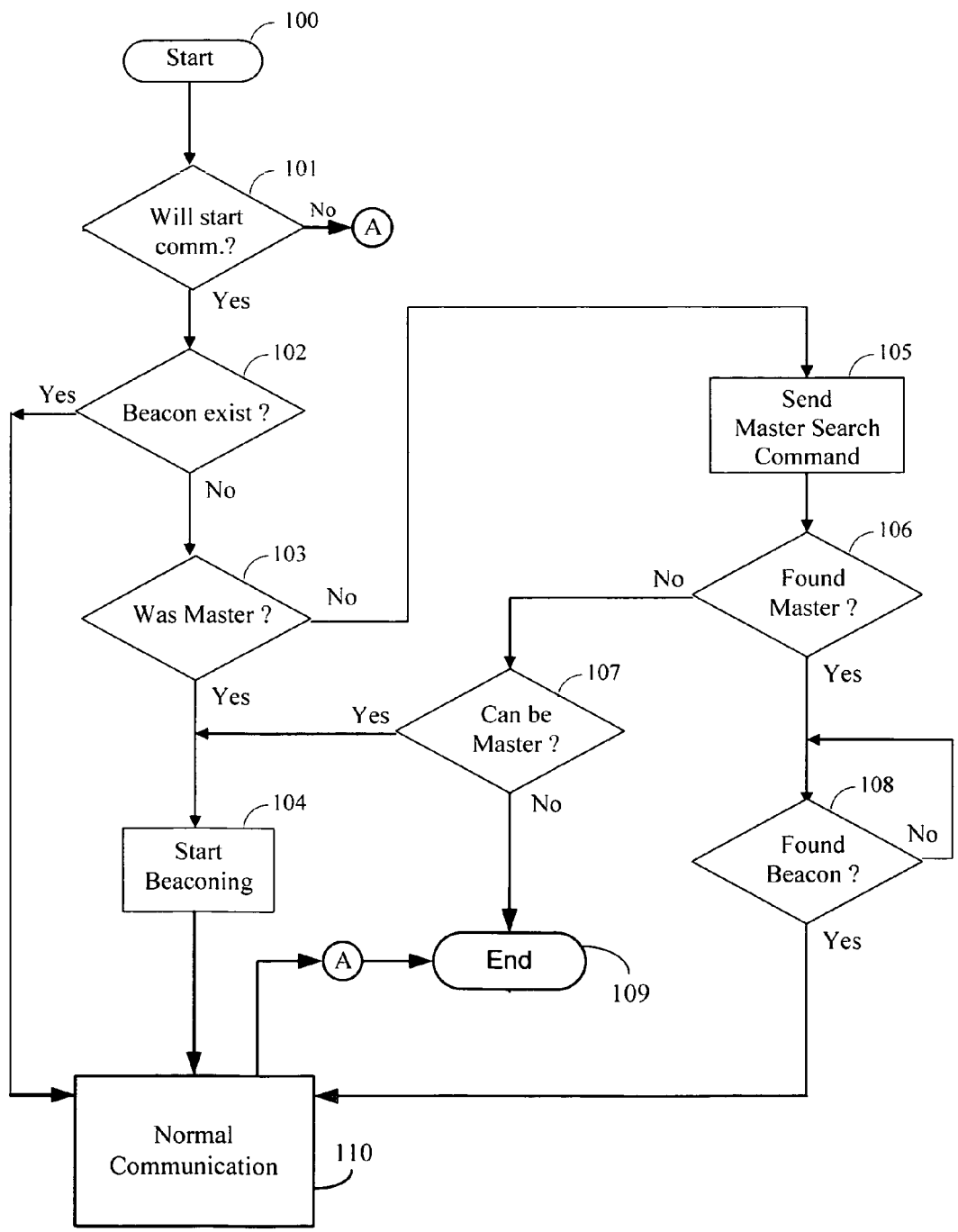
FIG. 2 is a flow chart depicting an exemplary process for initiation of network communication in a manner consistent with certain embodiments of the present invention.

FIG. 2 is a flow chart for initiation of network communication by a network device starting at 100. At branch 101, if the device starts communication, the process goes to branch 102. If not, the process ends at 109. At branch 102, the network device detects whether or not beacons exist on the network. If they exist, normal communication is initiated at 110, and the process ends at 109. If no beacon is found at 103, the process proceeds to branch 103. At branch 103, if this device is the ex-master (i.e., previously acted in the capacity of master before ceasing to transmit beacons), the process proceeds to 104. At 104, this device re-assumes its role as master and starts beaconing at 104. Normal communication then ensues at 110 and the process ends at 109. If the device is not the ex-master at 103, control of the process passes to 105. At 105, the device broadcasts a master search message to all the other devices on the network. At branch 106, a determination is made as to whether or not another network device responds (e.g., within a specified time period such as for example without limitation, 3 seconds). Such specified time period should be long enough for the master device to exit it's lower power operational mode and send a response. In certain embodiments, the master search message may also be retransmitted a specified number of times (for example without limitation, 3 times) in search of the master.

If no response message is received from a master device within the allotted constraints, the device can deduce that no master exists on the network In this case, the process goes to branch 107. At 107, if this device has master capability, the process goes to 104 and the initiating device starts beaconing. If the device has no master capability, the process ends at 109. At branch 106, if a response is received from the ex-master, branch 108 is executed. At branch 108, the device waits for that the master starts beaconing. If the master starts beaconing, normal communication ensues at 110 and the process ends at 109.

The master search message should preferably have the characteristics of being a robust message that is highly immune to noise and other disturbances that are likely to be encountered on the network. For example, in the case of a PLC network, the master search message can be transmitted using (low speed, robust, high error protection transmission protocol such as Binary Phase Shift Keying (BPSK) or Quadrature Phase Shift Keying (QPSK) with low bit rate and highly redundant error correction code). In one embodiment, which should be considered illustrative and not limiting, the master search message is formatted in the same manner as a beacon signal. Similarly, a reply from the master preferably uses a highly robust protocol, such as, for example without limitation, that used by the beacon signal. Of course, this example is not to be considered limiting, but rather is submitted as an illustration of the characteristics of a master search message. Generally, it is possible to use a transmission having characteristics and communication parameters similar to a beacon signal or other high reliability control signal to accomplish the master search message.

Figure 3:
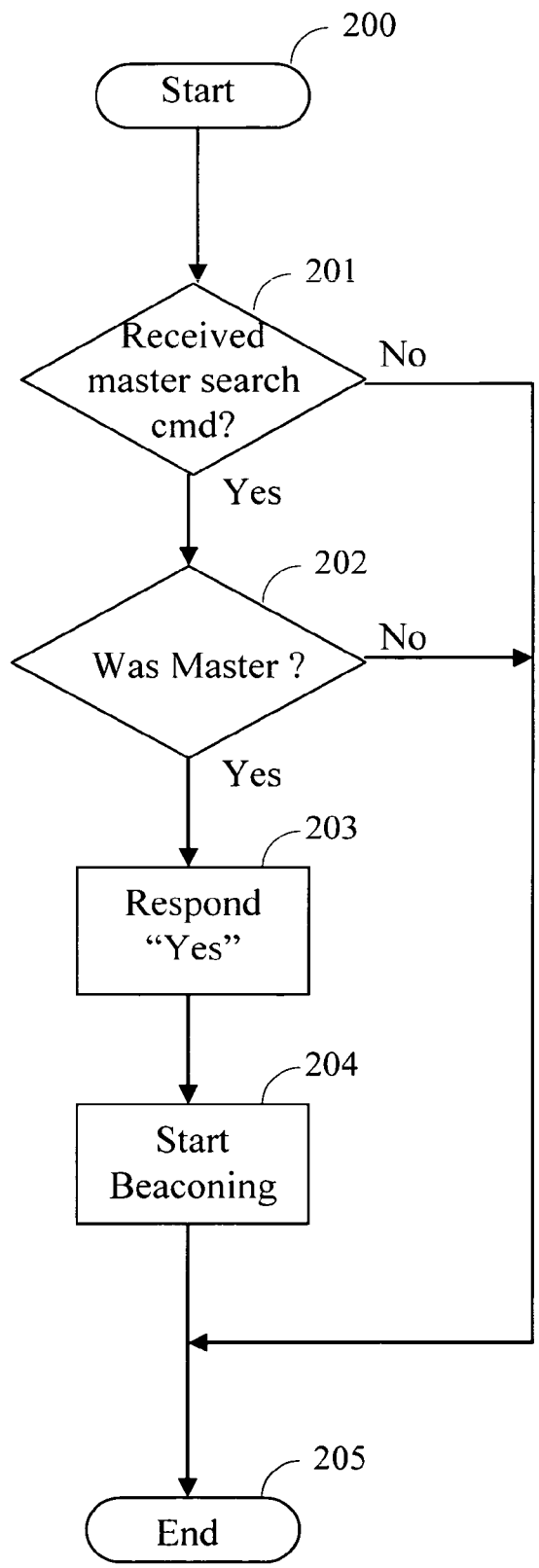
FIG. 3 is a flow chart of an example operation of a master device in a manner consistent with certain embodiments of the present invention. (All devices receive the master search command. This flow chart is not only for a master device. If it was not the master, the process jumps from 202 to 205.)

FIG. 3 shows a flow chart for a response from each device to a master search message. The process starts at 200. At branch 201, the process checks to see if a master search message has been received or not. Such action should be enabled even if the master device is currently in a lower power or standby mode. If not, the process ends at 205. If a master search message is received at 201, the device checks to see whether it was the master at branch 202. If not, the process ends at 205. If the recipient device was the master, it responds "Yes" to the master search message and provides its identity to the sender using a pre-defined master response message at 203. The master device then returns to the active master state and starts beaconing at 204. The process ends at 205. In accordance with certain embodiments, the response from the ex-master to the master search request may be implemented by the master device simply resuming transmission of beacons. In other embodiments, a designated response signal is transmitted. The master continues beaconing as long as it communicates with another device or two or more other devices communicate with each other. When communication has ended for a specified period of time (which may be user programmable), the master may stop beaconing and re-enter a lower power state.

Thus, an exemplary method of operation of network devices with one device operating as a master device on a communication network involves the master device broadcasting a beacon during a communication session being carried out over the network; the master device determining that the communication session being carried out over the network has ended; the master device ceasing broadcast of the beacon; the master device entering at least one of a sleeping or power saving mode; at a client device on the network, transmitting a master search message requesting services of a master device while the master device is in the sleeping or power saving mode; the master device responding to the master search message; and the master device resuming broadcasting beacon signals.

In certain illustrative embodiments, a method of communication from a first device to a second device over a communication network involves at the first device, determining if a beacon has been received within an established period of time; if not, the first device broadcasting a master search message that requests services of a master device; and if a response from a master device is received, obtaining communication parameters from the master device permit network communication, and transmitting information from the first device to the second device. In certain embodiments, if a response from a master device is not received within the established period of time, the method further involves determining that the first device is capable of operating as a master device; establishing the first device as the master device; the master device generating communication parameters to permit network communication; transmitting beacons from the first device; and transmitting information from the first device to second device.

In another embodiment, a method of operation of a network device operating as a master device on a communication network involves broadcasting a beacon during a communication session being carried out over the network; determining that the communication session being carried out over the network has ended; ceasing broadcast of the beacon; and the master device entering a sleeping or power saving mode. In certain embodiments, the method further involves at the master device, receiving a master search message requesting services of a master device while the master device is in the sleeping or power saving mode; and the master device responding to the master search message. In certain embodiments the method further involves broadcasting a beacon. In certain embodiments the responding involves broadcasting a beacon. In certain embodiments the responding involves transmitting an acknowledgement of the master search message and identification of the master device. In certain embodiments the network is a power line communication network. In certain embodiments network communication is carried out using a plurality of communication mechanisms defined in a network communication protocol, and the master search message is communicated using the network communication protocol's highest reliability communication mechanism. In certain embodiments network communication is carried out using a plurality of communication mechanisms defined in a network communication protocol, and the responding is carried out using the network communication protocol's highest reliability communication mechanism. In certain embodiments the network communication is carried out using a plurality of communication mechanisms defined in a network communication protocol, and the master search message is transmitted using the network communication protocol's communication mechanism used for beacons. In certain embodiments the master search message is communicated using one of BPSK and QPSK modulation.

Certain embodiments consistent with the present invention can be realized an electronic storage medium carrying instructions which, when executed on a programmed processor residing in the network device, cause the processor to control operation of the network device in accordance with the above embodiments of methods consistent with the present invention.

In another embodiment, a method of operation of a network device operating as a master device on a communication network involves, at the master device transmitting beacon signals; at the master device, entering an operational mode wherein the master device temporarily ceases transmission of the beacons; while in the operational mode, the master device receiving a master search message requesting services of a master device while the master device is in the operational mode; and the master device responding to the master search message. In certain embodiments the operational mode is at least one of a sleeping mode or a power saving mode.

While the present invention has been illustrated in connection with a PLC network, the principles can be applied to other wired or wireless networks, for example, 802.11 or Ethernet without departing from embodiments consistent with the present invention.

Those skilled in the art will recognize, upon consideration of the above teachings, that certain of the above exemplary embodiments are based upon use of a programmed processor. For example, the master's operation or that of a network device operating to request a master by sending a master search request signal may be controlled using a programmed processor (e.g., a microcontroller or a microcomputer). However, the invention is not limited to such exemplary embodiments, since other embodiments could be implemented using hardware component equivalents such as special purpose hardware and/or dedicated processors. Similarly, general purpose computers, microprocessor based computers, microcontrollers, optical computers, analog computers, dedicated processors, application specific circuits and/or dedicated hard wired logic may be used to construct alternative equivalent embodiments.

Those skilled in the art will appreciate, upon consideration of the above teachings, that the program operations and processes and associated data used to implement certain of the embodiments described above can be implemented using disc storage as well as other forms of storage such as for example Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies without departing from certain embodiments of the present invention. Such alternative storage devices should be considered equivalents.

Certain exemplary embodiments described herein, are or may be implemented using a programmed processor executing programming instructions that are broadly described above in flow chart form that can be stored on any suitable electronic or computer readable storage medium and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method of communication from a first power line communication (PLC) device to a second PLC device over a PLC network, comprising:
    at the first PLC device, in response to detection of a user instruction to start streaming content to the second PLC device, determining if a communication synchronization beacon signal has been received from a PLC master device within a first established period of time, where the first PLC device and the PLC master device comprise at least one of an audio streaming device and a video streaming device associated with the PLC network;
    if not, the first PLC device determining that a communication session being carried out over the PLC network has ended;
    broadcasting, in response to determining that the communication session being carried out over the PLC network has ended, a master search message that requests services of the PLC master device, where the master search message is formatted in a same manner as the communication synchronization beacon signal; and
    if an acknowledgement is received from the PLC master device within a second established period of time, obtaining communication parameters from the PLC master device to permit a streaming PLC network communication over the PLC network, and streaming the content from the first PLC device to the second PLC device using the obtained communication parameters.

2. The method according to claim 1, wherein if the acknowledgement from the PLC master device is not received within the second established period of time, the method further comprises:
    determining that the first PLC device is capable of operating as a new PLC master device;
    establishing the first PLC device as the new PLC master device;
    generating, via the new PLC master device, communication parameters to permit the streaming PLC network communication;
    transmitting the communication synchronization beacon signal from the first PLC device; and
    streaming the content from the first PLC device to the second PLC device using the generated communication parameters.

3. The method according to claim 1, wherein the acknowledgement comprises the communication synchronization beacon signal.

4. The method according to claim 1, wherein the acknowledgement comprises an acknowledgement of the master search message and identification of the master device.

5. The method according to claim 1, wherein the streaming PLC network communication is carried out using a plurality of communication mechanisms defined in a PLC network communication protocol, and wherein the master search message is transmitted using the PLC network communication protocol's highest reliability communication mechanism.

6. The method according to claim 1, wherein the streaming PLC network communication is carried out using a plurality of communication mechanisms defined in a PLC network communication protocol, and wherein the acknowledgement is transmitted using the PLC network communication protocol's highest reliability communication mechanism.

7. The method according to claim 1, wherein the streaming PLC network communication is carried out using a plurality of communication mechanisms defined in a PLC network communication protocol, and wherein the master search message is transmitted using the PLC network communication protocol's communication mechanism used for communication synchronization beacon signals.

8. The method according to claim 1, wherein the master search message is transmitted using one of BPSK and QPSK modulation.

9. The method according to claim 1, wherein the master search message is retransmitted in an attempt to identify a master device.

10. The method according to claim 1, wherein the acknowledgement comprises a pre-defined master response message.

11. An electronic storage medium, carrying instructions which, when executed on a programmed processor residing in the first PLC device, cause the processor to control operation of the first PLC device in accordance with the method of claim 1.

12. A method, comprising:
    determining, at a first power line communication (PLC) device in response to detection of a user instruction to stream content from the first PLC device to a second PLC device, whether a PLC master device on a PLC network has entered a power-down mode;
    in response to determining that the PLC master device has entered a power-down mode:
        assuming a role of the master PLC device on the PLC network;
        sending communication synchronization beacon signaling to the second PLC device over the PLC network; and
        streaming the content to the second PLC device concurrently with the communication synchronization beacon signaling.

13. The method according to claim 12, further comprising:
    at the PLC master device, receiving a master search message requesting services of the PLC master device while the PLC master device is in one of the sleeping mode or power saving mode; and
    the PLC master device responding to the master search message.

14. The method according to claim 13, wherein the responding comprises broadcasting, via the PLC master device, the communication synchronization beacon signal.

15. The method according to claim 13, wherein the responding comprises transmitting an acknowledgement of the master search message and identification of the PLC master device.

16. The method according to claim 13, wherein the streaming PLC network communication is carried out using a plurality of communication mechanisms defined in a PLC network communication protocol, and wherein the master search message is received using the PLC network communication protocol's highest reliability communication mechanism.

17. The method according to claim 13, wherein the streaming PLC network communication is carried out using a plurality of communication mechanisms defined in a PLC network communication protocol, and wherein the responding is carried out using the PLC network communication protocol's highest reliability communication mechanism.

18. The method according to claim 13, wherein the streaming PLC network communication is carried out using a plurality of communication mechanisms defined in a PLC network communication protocol, and wherein the master search message is transmitted using the PLC network communication protocol's communication mechanism used for communication synchronization beacon signals.

19. The method according to claim 13, wherein the master search message is received as one of BPSK and QPSK modulation.

20. The method according to claim 13, wherein the acknowledgement comprises a pre-defined master response message.

21. The method according to claim 12, further comprising:
    at the PLC master device, entering an operational mode wherein the PLC master device temporarily ceases transmission of the communication synchronization beacon signals in response to a determination that a communication session being carried out between a first PLC device and a second PLC device as streaming PLC network communication over the PLC network has ended;
    while in the operational mode, the PLC master device receiving a master search message requesting services of the PLC master device, where the master search message is formatted in a same manner as the communication synchronization beacon signals and is sent from the second PLC device in response to detection of a user instruction received by the second PLC device to start a new streaming PLC communication over the PLC network; and
    the PLC master device responding to the master search message.

22. The method according to claim 21, wherein the operational mode comprises at least one of a sleeping mode or a power saving mode.

23. The method according to claim 21, wherein the responding comprises broadcasting a communication synchronization beacon signal.

24. The method according to claim 21, wherein the responding comprises transmitting an acknowledgement of the master search message and identification of the PLC master device.

25. The method according to claim 21, wherein the new streaming PLC network communication is carried out using a plurality of communication mechanisms defined in a PLC network communication protocol, and wherein the master search message is received using the PLC network communication protocol's highest reliability communication mechanism.

26. The method according to claim 21, wherein the new streaming PLC network communication is carried out using a plurality of communication mechanisms defined in a PLC network communication protocol, and wherein the responding is carried out using the PLC network communication protocol's highest reliability communication mechanism.

27. The method according to claim 21, wherein the new streaming PLC network communication is carried out using a plurality of communication mechanisms defined in a PLC network communication protocol, and wherein the master search message is transmitted using the PLC network communication protocol's communication mechanism used for communication synchronization beacon signals.

28. The method according to claim 21, wherein the master search message is received as one of BPSK and QPSK modulation.

29. An electronic storage medium, carrying instructions which, when executed on a programmed processor residing in the PLC master device, cause the processor to control operation of the PLC master device in accordance with the method of claim 21.

30. The method according to claim 21, wherein the responding to the master search message comprises transmitting a pre-defined master response message.

31. An electronic storage medium, carrying instructions which, when executed on a programmed processor residing in the PLC master device, cause the processor to control operation of the PLC master device in accordance with the method of claim 13.

32. An electronic storage medium, carrying instructions which, when executed on a programmed processor residing in the PLC master device, cause the processor to control operation of the PLC master device in accordance with the method of claim 12.

* * * * *